US008571100B2

(12) United States Patent
Lu et al.

(10) Patent No.: US 8,571,100 B2
(45) Date of Patent: Oct. 29, 2013

(54) FAST INTRA MODE PREDICTION FOR A VIDEO ENCODER

(75) Inventors: Xiaoan Lu, Brooklyn, NY (US); Peng Lin, West Windsor, NJ (US); Jill MacDonald Boyce, Manalapan, NJ (US)

(73) Assignee: Thomson Licensing, Boulogne-Billcourt (FR)

( * ) Notice: Subject to any disclaimer, the term of this patent is extended or adjusted under 35 U.S.C. 154(b) by 1094 days.

(21) Appl. No.: 11/666,061

(22) PCT Filed: Oct. 19, 2005

(86) PCT No.: PCT/US2005/037469
§ 371 (c)(1),
(2), (4) Date: Jan. 3, 2008

(87) PCT Pub. No.: WO2006/052399
PCT Pub. Date: May 18, 2006

(65) Prior Publication Data
US 2008/0232463 A1    Sep. 25, 2008

Related U.S. Application Data

(60) Provisional application No. 60/624,871, filed on Nov. 4, 2004.

(51) Int. Cl.
*H04B 1/66* (2006.01)

(52) U.S. Cl.
USPC ............. 375/240.12; 375/240.14; 375/240.16

(58) Field of Classification Search
USPC .......................................... 375/240.1–240.16
See application file for complete search history.

(56) References Cited

U.S. PATENT DOCUMENTS

| | | | | |
|---|---|---|---|---|
| 5,835,060 A | * | 11/1998 | Czarnecki et al. | 342/442 |
| 7,830,960 B2 | * | 11/2010 | Liang et al. | 375/240.12 |
| 7,881,374 B2 | * | 2/2011 | Caball et al. | 375/240.11 |
| 8,085,846 B2 | * | 12/2011 | Tourapis et al. | 375/240.16 |
| 2003/0118101 A1 | * | 6/2003 | Dinerstein | 375/240.12 |
| 2003/0138150 A1 | | 7/2003 | Srinivasan | |
| 2005/0135484 A1 | * | 6/2005 | Lee et al. | 375/240.16 |
| 2005/0249277 A1 | * | 11/2005 | Ratakonda et al. | 375/240.03 |
| 2005/0281337 A1 | * | 12/2005 | Kobayashi et al. | 375/240.18 |

(Continued)

FOREIGN PATENT DOCUMENTS

WO    WO 2004/064398    7/2004
WO    WO2004080084    9/2004

OTHER PUBLICATIONS

Peng Yin et all, Fast mode decision and motion estimation for JVT/H.264 ,vol. 3, Sep. 14-17, 2003, 4 pages.*

(Continued)

*Primary Examiner* — Ayaz Sheikh
*Assistant Examiner* — Mounir Moutaouakil
(74) *Attorney, Agent, or Firm* — Robert D. Shedd; Paul P. Kiel; Xiaoan Lu (57) ABSTRACT

There are provided video encoders and corresponding methods for encoding video data for an image that is divisible into macroblocks. A video encoder includes an encoder for performing into mode selection when encoding a current macroblock by testing a first subset of intra modes to compute a rate distortion cost, and utilizing the rate distortion cost to determine whether to terminate the intra mode selection and which additional intra modes, if any, are to be examined with respect to the current macroblock.

10 Claims, 8 Drawing Sheets

(56) References Cited

U.S. PATENT DOCUMENTS

| | | | |
|---|---|---|---|
| 2006/0062302 A1* | 3/2006 | Yin et al. | 375/240.16 |
| 2008/0232463 A1* | 9/2008 | Lu et al. | 375/240.02 |
| 2010/0034268 A1* | 2/2010 | Kusakabe et al. | 375/240.15 |
| 2010/0290526 A1* | 11/2010 | Tong et al. | 375/240.12 |
| 2010/0310184 A1* | 12/2010 | Yu et al. | 382/238 |
| 2011/0075738 A1* | 3/2011 | Wang et al. | 375/240.17 |
| 2011/0123108 A1* | 5/2011 | Suzuki et al. | 382/166 |

OTHER PUBLICATIONS

Kim, Changsung et al. Multistage Mode Decision for Intra Prediction in H.264 Codec, Visual Communications and Image Processing 2004, p. 355-363.

Lee, Jeyun, Fast Mode Decision for H.264, 2004 IEEE International Conference on Multimedia and Expo 2004, pp. 1131-1134.

Yin, Peng, Fast Mode Decision and Motion Estimation for JVT/H.264, 2003 IEEE, p. III-853-III-856.

Yu, Andy C. Efficient Intra—and—Inter—Mode Selection Algorithms for H.264/AVC, Journal of Cisual COmmunication Image Representation, 2005 pp. 322-344.

Zhang, Jianning, A Fast Intra Prediction Method for H.264 Video Coding, Proceddings of SPIE vol. 5203 Applications of Digital Image Processing XXVI, Aug. 5-8, 2003. p. 753-761.

Zhu, Dongdong et al. Faster Inter Prediction Mode Decision for H.264, 2004 IEEE International Conference on Multimedia and Expo, p. 1123-1126.

Search Report Dated Apr. 11, 2006.

Tanizawa, A., et al., "A Study on Fast-Rate-Distortion Optimized Coding Mode Decision for H.264", 2004 International Conference on Image Processing (ICIP), Oct. 24, 2004, vol. 2, pp. 793-796.

* cited by examiner

FAST INTRA MODE PREDICTION FOR A VIDEO ENCODER

CROSS-REFERENCE TO RELATED APPLICATIONS

This application claims the benefit, under 35 U.S.C. §365 of International Application PCT/US2005/037469, filed Oct. 19, 2005 published in accordance with PCT Article 21(2) on May 18, 2006 in English and which claims the benefit of U.S. provisional patent application No. 60/624,871 filed Nov. 4, 2004.

FIELD OF THE INVENTION

The present invention relates generally to video coding and, more particularly, to a method and apparatus for fast mode intra mode prediction for a video encoder.

BACKGROUND OF THE INVENTION

Intra mode prediction is used for both intra and inter frames. In intra frames, all macroblocks are coded in intra modes. For inter frames (P and B frames) both inter and intra prediction are used in the H.264 Standard (also known as JVT and MPEG-4 AVC). Each individual macroblock is either coded as intra, i.e. using only spatial correlation, or coded as inter, i.e. using temporal correlation from previously coded frames. In general, an encoder may make an inter/intra coding decision for each macroblock based on coding efficiency and subjective quality considerations. Inter coding is typically used for macroblocks that are well predicted from previous pictures, and intra coding is typically used for macroblocks that are not well predicted from previous pictures, and/or for macroblocks with low spatial activity.

In the H.264 standard, inter coding allows various block partitions (e.g., 16×16, 16×8, 8×16, and 8×8 for a macroblock, and 8×8, 8×4, 4×8, 4×4 for an 8×8 sub-macroblock partition) and multiple reference pictures to be used for predicting a 16×16 macroblock. Furthermore, JVT also supports SKIP and DIRECT modes.

For intra prediction, the following two block types are supported: INTRA 4×4; and INTRA 16×16.

Figure 1A:
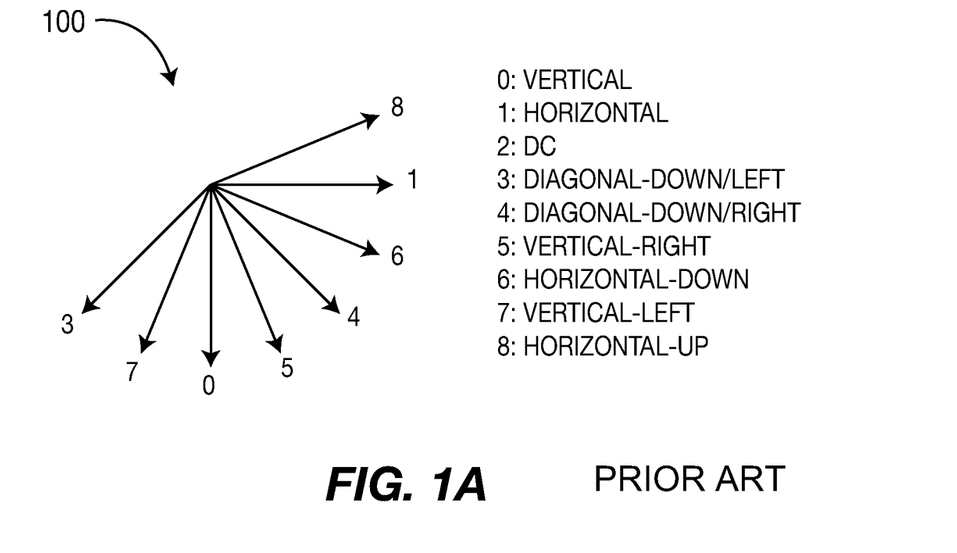
FIG. 1A shows INTRA 4×4 prediction modes to which the present invention may be applied.

Turning to FIG. 1A, INTRA 4×4 prediction modes are indicated generally by the reference numeral 100. The INTRA 4×4 prediction modes 100 include a vertical mode 0, a horizontal mode 1, a DC mode 2, a diagonal-down/left mode 3, a diagonal down/right mode 4, a vertical-right mode 5, a horizontal-down mode 6, a vertical-left mode 7, and a horizontal-up mode 8.

Figure 1B:
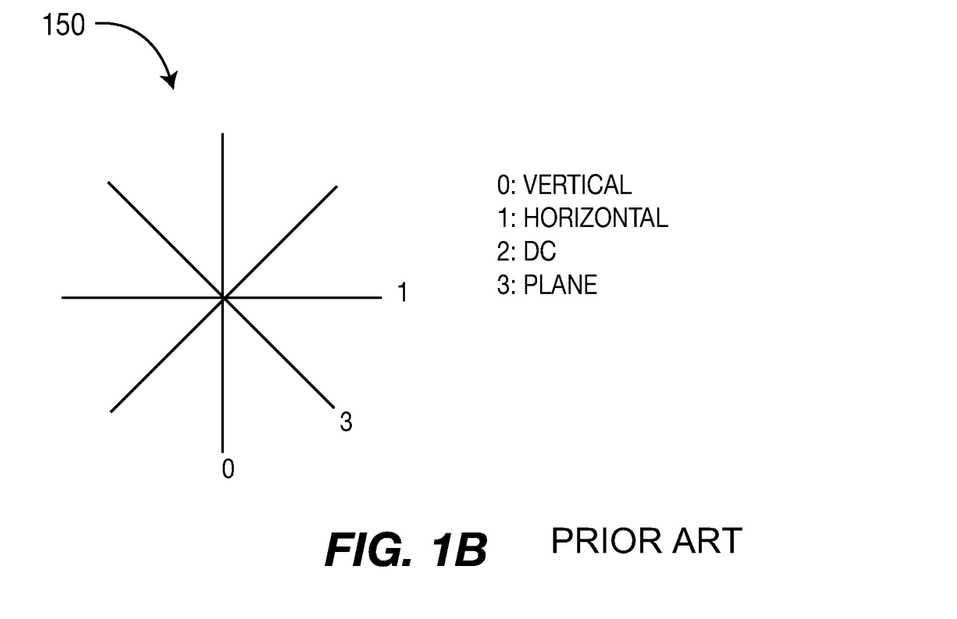
FIG. 1B shows INTRA 16×16 prediction modes to which the present invention may be applied.

Turning to FIG. 1B, INTRA 16×16 prediction modes are indicated generally by the reference numeral 150. The INTRA 16×16 prediction modes 150 include a vertical mode 0, a horizontal mode 1, a DC mode 2, and a PLANE mode 3.

In the prior art, a rate distortion optimization (RDO) framework is used for mode decisions. For inter modes, motion estimation is separately considered from mode decision. Motion estimation is first performed for all block types of inter modes, then the mode decision is made by comparing the cost of each inter mode and intra mode. The mode with the minimal cost is selected as the best mode.

A conventional procedure to encode one macroblock s in an intra coded (I) picture is summarized as follows. This procedure is hereinafter referred to as the "conventional macroblock encoding procedure".

In a first step of the conventional macroblock encoding procedure, the following are provided: the last decoded pictures, the Lagrangian multiplier $\lambda_{MODE}$, $\lambda_{MOTION}$, and the macroblock quantizer QP.

In a second step of the conventional macroblock encoding procedure, the macroblock intra prediction mode is chosen by minimizing $J(s, c, MODE|QP, \lambda_{MODE}) = SSD(s, c, MODE|QP) + \lambda_{MODE} \cdot R(s, c, MODE|QP)$, given QP and $\lambda_{MODE}$ when varying MODE. Symbol c represents the reconstructed macroblock. Symbol SSD represents the Sum of Square Differences between the original signal and the reconstructed signal. Symbol R(s, c, MODE) represents the number of bits associated with choosing MODE, including the bits for the macroblock header and all DCT coefficients. Symbol MODE represents a mode out of the set of potential macroblock modes:

MODE∈55 INTRA4×4,INTRA16×16}

The INTRA 4×4 modes include:

$$MODE \in \begin{Bmatrix} \text{vertical, horizontal,} \\ \text{DC, diagonal-down/left,} \\ \text{diagonal-down/right,} \\ \text{vertical-left,} \\ \text{horizontal-down,} \\ \text{vertical-right,} \\ \text{horizontal-up} \end{Bmatrix}$$

The INTRA 16×16 modes include:

MODE∈{vertical,horizontal,DC,plane}

To encode one macroblock s in an inter-coded (P or B) picture, the following two additional steps are employed.

The first additional step involves performing motion estimation and reference picture selection by minimizing $J(REF,m(REF)|\lambda_{MOTION}) = SAD(s,c(REF,m(REF))) + \lambda_{MOTION} \cdot (R(m(REF)-p(REF))+R(REF))$ for each reference picture and motion vector of a possible macroblock mode. In the equation, m represents the current motion vector being considered, REF represents the reference picture, p represents the motion vector used for the prediction during motion vector coding, R(m−p) represents the bits used for coding the motion vector, and R(REF) represents the bits for coding the reference picture. SAD represents the Sum of Absolute Differences between the original signal and the reference signal predicted by the motion vector.

The second additional step involves choosing the macroblock prediction mode by minimizing $J(s,c,MODE|QP,\lambda_{MODE}) = SSD(s,c,MODE|QP) + \lambda_{MODE} \cdot R(s,c,MODE|QP)$, given QP and $\lambda_{MODE}$ when varying MODE. R(s, c, MODE) includes the bits for the macroblock header, the motion and all DCT coefficients. MODE represents a mode out of the set of potential macroblock modes:

$$P\text{-frame: MODE} \in \begin{Bmatrix} INTRA\ 4\times4,\ INTRA\ 16\times16, \\ SKIP, \\ 16\times16,\ 16\times8, \\ 8\times16,\ 8\times8, \\ 8\times4,\ 4\times8, \\ 4\times4 \end{Bmatrix},$$

$$B\text{-frame: MODE} \in \begin{Bmatrix} INTRA\ 4\times4,\ INTRA\ 16\times16, \\ BIDIRECT,\ DIRECT, \\ FWD\ 16\times16,\ FWD\ 16\times8, \\ FWD\ 8\times16,\ FWD\ 8\times8, \\ FWD\ 8\times4,\ FWD\ 4\times8, \\ FWD\ 4\times4,\ BAK\ 16\times16, \\ BAK\ 16\times8,\ BAK\ 8\times16, \\ BAK\ 8\times8,\ BAK\ 8\times4, \\ BAK\ 4\times8,\ BAK\ 4\times4 \end{Bmatrix}.$$

It is to be appreciated that, for an I picture, the second step of the conventional macroblock encoding procedure is employed in place of the preceding second additional step.

Figure 2A:
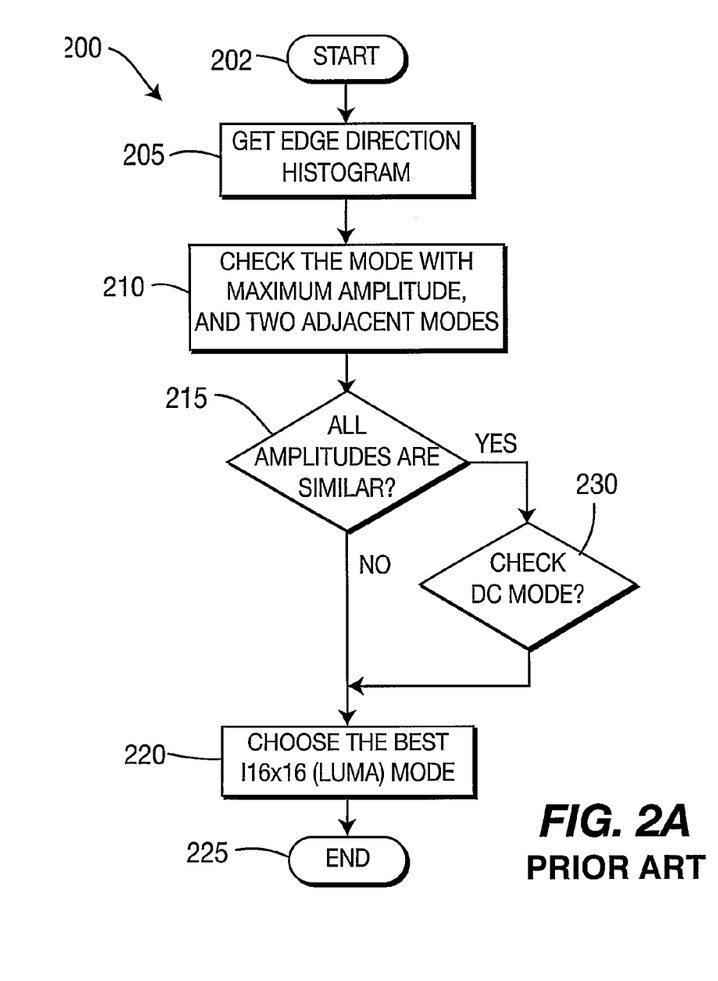
FIG. 2A shows a flow diagram for a method for performing mode decision for an INTRA 16×16 luma sample using edge information in accordance with the prior art.
Figure 2B:
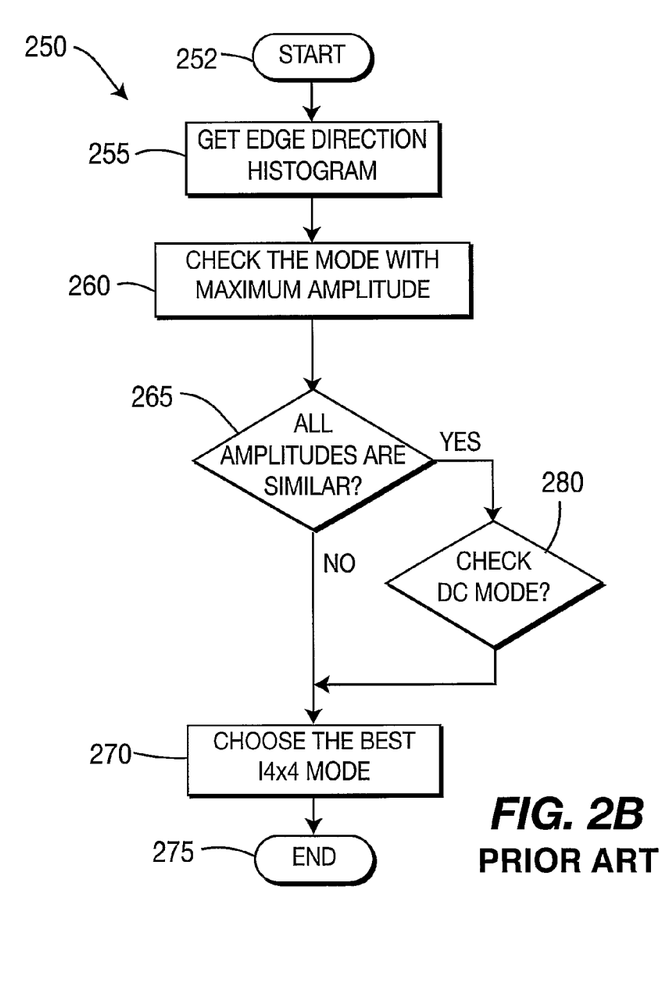
FIG. 2B shows a flow diagram for a method for performing mode decision for an INTRA 4×4 sample using edge information in accordance with the prior art.

In the prior art, in particular, in relation to the conventional macroblock encoding procedure described above, a picture is first analyzed using edge detection as in FIGS. 2A and 2B. Only modes with orientations closer to the dominant edge direction are examined.

Turning to FIG. 2A, a method for performing mode decision for an INTRA 16×16 luma sample using edge information is indicated generally by the reference numeral 200. The method 200 includes a start block 202 that passes control to a function block 205. The function block 205 obtains an edge direction histogram, and passes control to a function block 210. The function block 210 checks the mode with the maximum amplitude in the edge direction histogram and two adjacent modes, and passes control to a decision block 215. The decision block 215 determines whether or not all of the amplitudes (of the mode with the maximum amplitude and the two adjacent modes) are similar. If all of the amplitudes are not similar, then control is passes to a function block 220. Otherwise, if all of the amplitudes are similar, then control is passes to a function block 230.

The function block 220 chooses the best INTRA 16×16 (luma) prediction mode of the tested modes, and passes control to an end block 225.

The decision block 230 checks the DC mode, and passes control to function block 220.

Turning to FIG. 2B, a method for performing mode decision for an INTRA 4×4 sample using edge information is indicated generally by the reference numeral 250.

The method 250 includes a start block 252 that passes control to a function block 255. The function block 255 obtains an edge direction histogram, and passes control to a function block 260. The function block 260 checks the mode with the maximum amplitude in the edge direction histogram, and passes control to a decision block 265. That is, the function block 260 checks the maximum amplitude in one direction and then checks the amplitudes in the other directions to determine, in conjunction with decision block 265, whether we want to check DC modes. The decision block 265 determines whether or not all of the amplitudes are similar. If all of the amplitudes are not similar, then control is passes to a function block 270. Otherwise, if all of the amplitudes are similar, then control is passes to a function block 280.

The function block 270 chooses the best INTRA 4×4 prediction mode of the tested modes, and passes control to an end block 275.

The decision block 280 checks the DC mode, and passes control to function block 270.

With respect to another prior art approach, for inter frames, SKIP mode and 16×16 mode are examined first. If the distortion is small enough (either SKIP mode or 16×16 mode is already a good mode for this macroblock), then not all sub-modes for INTRA 4×4 need to be tested. Accordingly, the search may be terminated faster without much impact in quality. Thus, this approach reduces the complexity of intra mode decision by using information from inter coding. This approach is shown and described with respect to FIG. 3.

Figure 3:
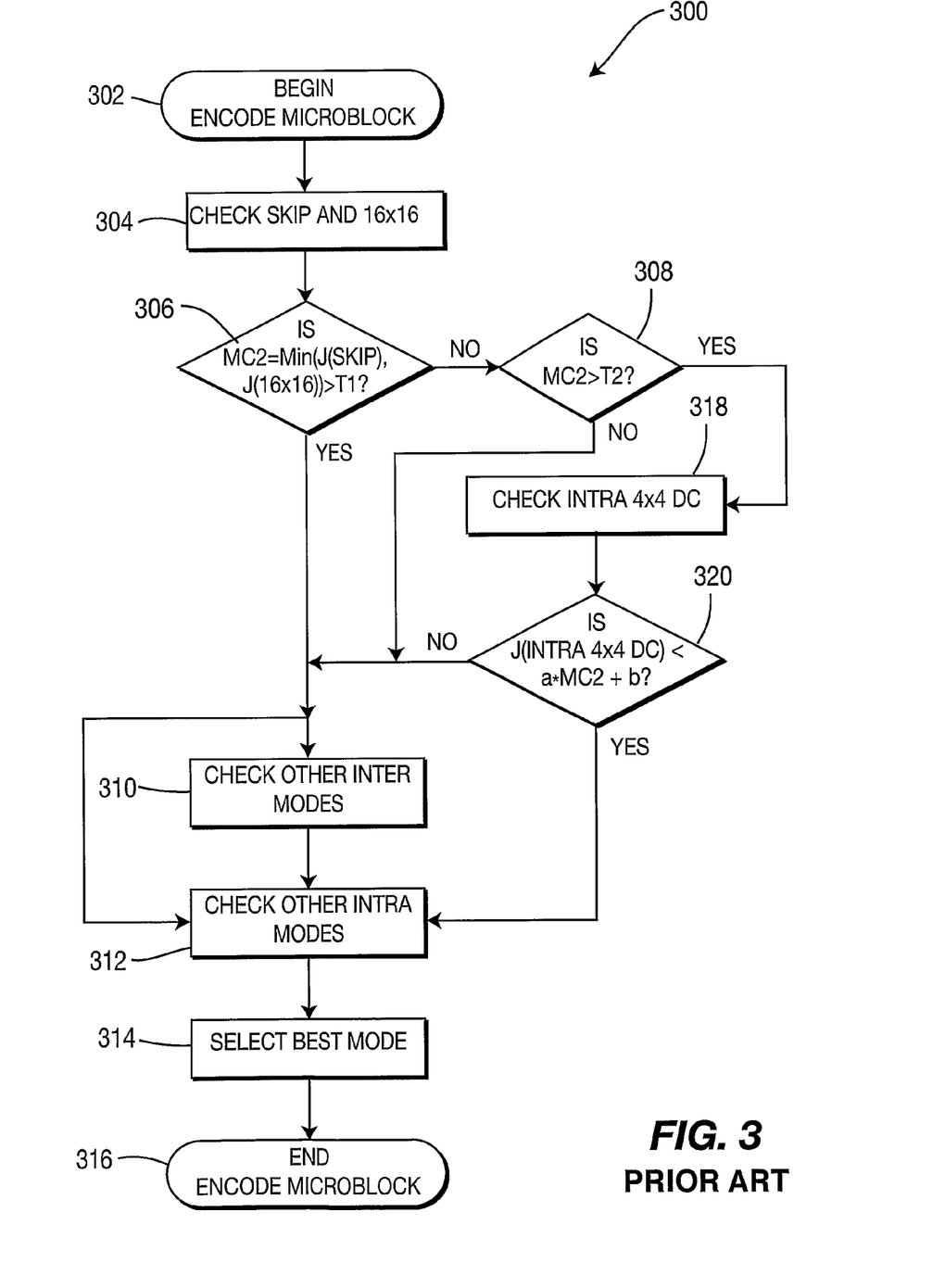
FIG. 3 shows a flow diagram for a method for mixed inter-intra mode decision in accordance with the prior art.

Turning to FIG. 3, a method for mixed inter-intra mode decision is indicated generally by the reference numeral 300. The method 300 includes a start block 302 that passes control to a function block 304. The function block 304 checks SKIP mode and 16×16 mode, and passes control to a decision block 306. The decision block 306 determines whether or not MC2>T1, where MC2=min(J(SKIP), J(16×16)), the minimum distortion between SKIP mode and 16×16 mode, and T1 is the first threshold. If MC2<=T1, then control is passed to a decision block 308. Otherwise, if MC2=min(J(SKIP), J(16×16))>T1, then control is passed to a function block 310 and a function block 312.

The decision block 308 determines whether or not MC2 is greater than T2 (a second threshold). If MC2 is not greater than T2, then control is passed to function block 310 and function block 312. Otherwise, if MC2 is greater than T2, then control is passed to a function block 318.

The function block 310 checks other inter modes, and passes control to a function block 312. The function block 312 checks other non-tested intra modes, and passes control to a function block 314. The function block 314 selects the best mode from among the evaluated modes, and passes control to an end block 316. The end block 316 ends the macroblock encoding.

The function block 318 checks the INTRA 4×4 DC, and passes control to a decision block 320. The decision block 320 determines whether or not J(INTRA 4×4 DC) is less than a*MC2+b, where a and b are constants. If J(INTRA 4×4 DC) is not less than a*MC2+b, then control is passed to function block 310 and function block 312. Otherwise, if J(INTRA 4×4 DC) is less than a*MC2+b, then control is passed to the function block 312.

Accordingly, it would be desirable and highly advantageous to have a method and apparatus for fast intra mode prediction for a video encoder that overcomes the above-described problems of the prior art.

SUMMARY OF THE INVENTION

These and other drawbacks and disadvantages of the prior art are addressed by the present invention, which is directed to a method and apparatus for fast intra mode prediction for a video encoder.

According to an aspect of the present invention, there is provided a video encoder for encoding video data for an image that is divisible into macroblocks. The video encoder includes an encoder for performing intra mode selection when encoding a current macroblock by testing a subset, S1, of intra modes to compute a rate distortion (RD) cost, and utilizing the RD cost to determine whether to terminate the intra mode selection and which additional intra modes, if any, are to be examined with respect to the current macroblock.

According to another aspect of the present invention, there is provided a video encoder for encoding video data for an image. The video encoder includes an encoder for performing intra prediction direction based on a block type partition of a best inter mode.

According to yet another aspect of the present invention, there is provided a video encoder for encoding video data for an image. The video encoder includes an encoder for performing INTRA 4×4 prediction direction based on a best sub-mode of INTRA 16×16.

According to a further aspect of the present invention, there is provided a method for encoding video data for an image that is divisible into macroblocks. The method includes the step of performing intra mode selection when encoding a current macroblock. The performing step includes the step of testing a subset, S1, of intra modes to compute a rate distortion (RD) cost. The performing step further includes the step of utilizing the RD cost to determine whether to terminate the intra mode selection and which additional intra modes, if any, are to be examined with respect to the current macroblock.

According to a still further aspect of the present invention, there is provided a method for encoding video data for an image. The method includes the step of performing intra prediction direction based on a block type partition of a best inter mode.

According to an additional aspect of the present invention, there is provided a method for encoding video data for an image. The method includes the step of performing INTRA 4×4 prediction direction based on a best sub-mode of INTRA 16×16.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to a method and apparatus for fast intra mode prediction for a video encoder. Advantageously, the present invention reduces the complexity of intra mode prediction, while at the same time maintaining coding efficiency, as compared to prior art approaches to fast intra mode prediction.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention provides a method and apparatus for fast intra mode prediction. Advantageously, the present invention reduces the complexity of mode decision. In contrast to the approach of FIG. 3, which reduces the complexity of intra mode decision by using information from inter coding, the present invention advantageously may be combined with the approach of FIG. 3 to reduce the complexity of intra mode decision using information from intra coding. That is, information from INTRA 16×16 and INTRA 4×4 prediction is used to reduce the complexity. Thus, instead of content analysis that adds computation overhead, the intermediate information during intra coding is utilized to reduce the complexity of mode decision. In an exemplary embodiment of the present invention, INTRA 16×16 mode is examined before INTRA 4×4. Of course, given the teachings of the present invention provided herein, one of ordinary skill in this and related arts will contemplate other examination orderings and corresponding modes for use in accordance with the principles of the present invention while maintaining the scope of the present invention.

Figure 4:
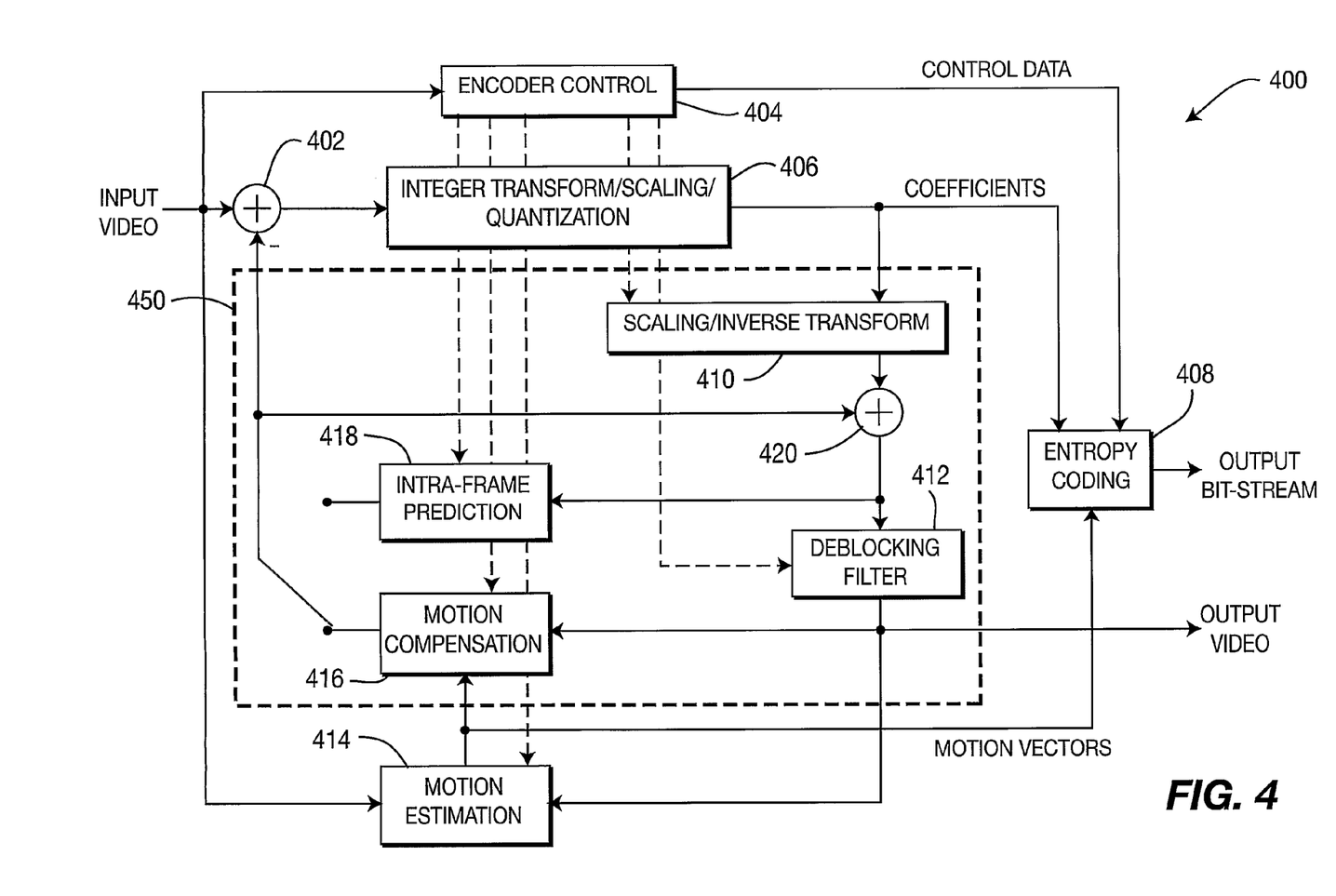
FIG. 4 shows a flow diagram for a video encoder in accordance with the principles of the present invention.

Turning to FIG. 4, a video encoder is indicated generally by the reference numeral 400.

An input to the video encoder 400 is connected in signal communication with an input of an encoder controller 404, with a non-inverting input of a summing junction 402, and with a first input of a motion estimator 414. A first output of the encoder controller 404 is connected in signal communication with a first input of an entropy coder 408. A second output of the encoder controller 404 is connected in signal communication with a first input of an intra-frame predictor 418. A third output of the encoder controller 404 is connected in signal communication with a first input of a motion compensator 416. A fourth output of the encoder controller 404 is connected in signal communication with a first input of a motion estimator 414. A fifth output of the encoder controller 404 is connected in signal communication with a first input of a scaler/inverse transformer 410. A sixth output of the encoder controller 404 is connected in signal communication with a first input of a deblocking filter 412.

An output of the summing junction 402 is connected in signal communication with an input of an integer transformer/scaler/quantizer 406. An output of the integer transformer/scaler/quantizer 406 is connected in signal communication with a second input of the entropy coder 408 and with a second input of the scaler/inverse transformer 410. An output of the scaler/inverse transformer 410 is connected in signal communication with a first input of a summing junction 420. An output of the summing junction 420 is connected in signal communication with a second input of the deblocking filter 412, and with a second input of the intra-frame predictor 418. An output of the deblocking filter 412 is connected in signal communication with a second input of the motion compensator 416, with a second input of the motion estimator 414, and is also available as a video output of the encoder 400. An output of the entropy coder 408 is available as an output of the encoder 400 for outputting an output bit-stream. An output of the motion estimator 414 is connected in signal communication with a third input of the entropy coder 408 and with a third input of the motion compensator 416. Either an output of the motion compensator 416 or an output of the intra-frame predictor 418 is connected in signal communication with an inverting input of the summing junction 402, and with a second input of the summing junction 420.

The encoder 400 includes a decoder 450 that, in turn, is formed from the scaler/inverse transformer 410, the summing junction 420, the deblocking filter 412, the motion compensator 416, and the intra-frame predictor 418.

Figure 5:
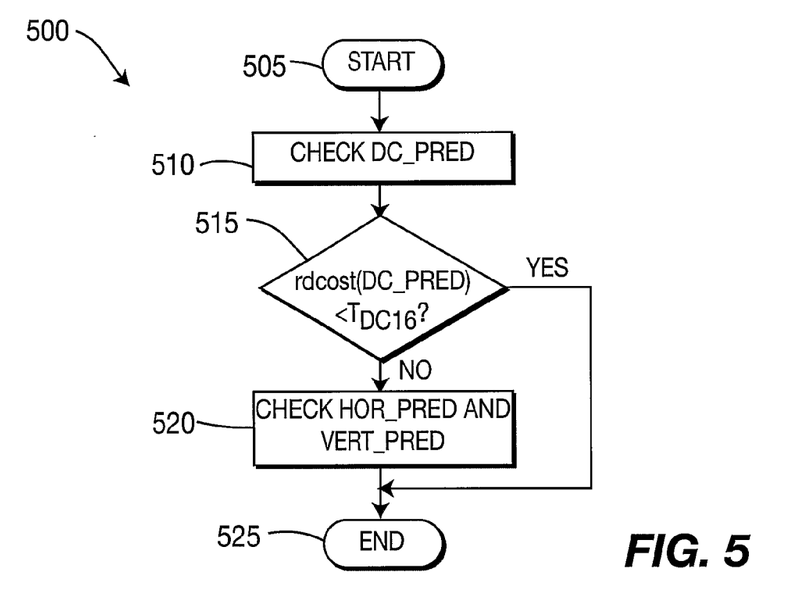
FIG. 5 shows a flow diagram for a method for mode decision for INTRA 16×16 in accordance with the principles of the present invention.

Turning to FIG. 5, a method for mode decision for INTRA 16×16 is indicated generally by the reference numeral 500. The method 500 includes a start block 505 that passes control to a function block 510. The function block 510 checks the DC prediction mode (DC_PRED), and passes control to a decision block 515. The decision block. 515 determines whether or not the rate-distortion cost of the DC prediction mode, rdcost(DC_PRED), is less than a threshold $T_{DC16}$. If rdcost(DC_PRED) is not less than the threshold $T_{DC16}$, then control is passed to a function block 520. Otherwise, if rdcost (DC_PRED) is less than the threshold $T_{DC16}$, then control is passed to an end block 525.

The function block 520 checks HOR_PRED and VERT_PRED, and passes control to end block 525.

As illustrated in FIG. 5, within INTRA 16×16 mode, the DC mode is tested before vertical and horizontal modes. When $J(s, c, MODE|QP, \lambda_{I16 \times 16, DC\_PRED})$ is less than a threshold $T_{DC16}$, the mode decision process is terminated and DC mode is used for INTRA 16×16. Otherwise, vertical and horizontal modes will be tested.

Figure 6:
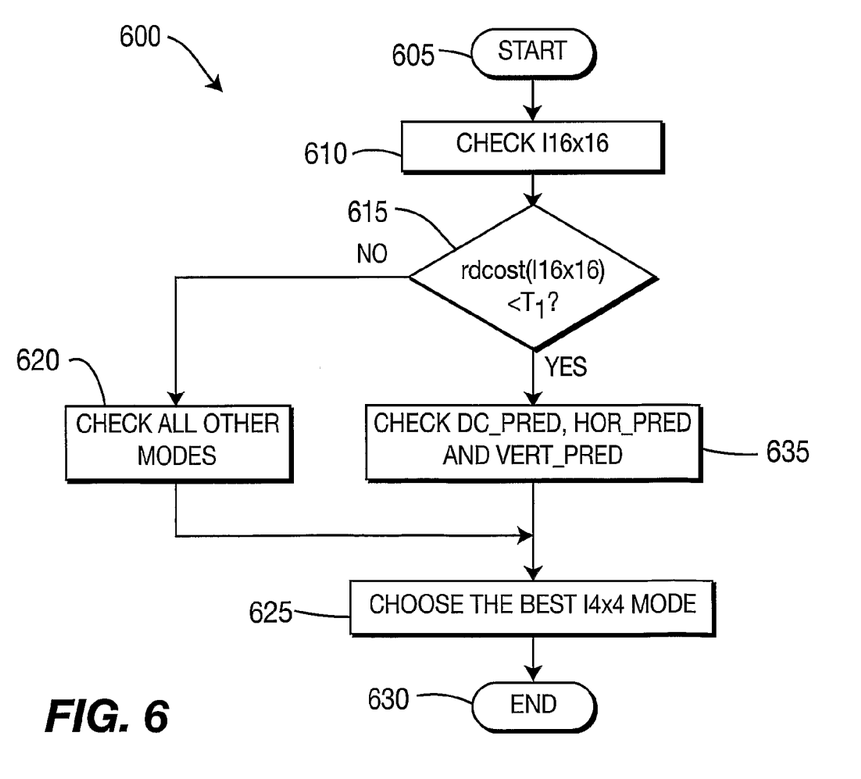
FIG. 6 shows a flow diagram for a method for mode decision for INTRA 4×4 using information obtained from INTRA 16×16 mode decision in accordance with the principles of the present invention.

Turning to FIG. 6, a method for mode decision for INTRA 4×4 using information obtained from INTRA 16×16 mode decision is indicated generally by the reference numeral 600. The method 600 includes a start block 605 that passes control to a function block 610. The function block 610 checks INTRA 16×16 mode, and passes control to a decision block 615. The decision block 615 determines whether or not the rate-distortion cost of the INTRA 16×16 mode, rdcost(I16×16), is less than a threshold $T_1$. If rdcost(I16×16) is not less than the threshold $T_1$, then control is passed to a function block 620. Otherwise, if rdcost(I16×16) is less than the threshold $T_1$, then control is passes to a function block 635.

The function block 620 checks all other modes, and passes control to a function block 625. The function block 625 chooses the best INTRA 16×16 mode from among the tested modes, and passes control to an end block 630.

The function block 635 checks the DC mode, the horizontal prediction mode (HOR_PRED) and the vertical prediction mode (VERT_PRED), and passes control to end block 630.

As shown in FIG. 6, after INTRA 16×16 is examined, if $J(s, c, MODE|QP, \lambda_{16 \times 16})$ from step 2 (for I-pictures) of the conventional macroblock encoding procedure is below a threshold T1, only 3 modes (DC, vertical and horizontal) will be tested for INTRA 4×4. Otherwise, all 9 possible modes will be tested for INTRA 4×4.

Within INTRA 4×4 modes, the order of examining 9 modes is changed from {vertical, horizontal, DC, diagonal-down/left, diagonal-down/right, vertical-right, horizontal-down, vertical-left, horizontal-up} to {DC, vertical, horizontal, diagonal-down/left, diagonal-down/right, vertical-right, horizontal-down, vertical-left, horizontal-up}. For the purposes of the present invention, {vertical, diagonal-down/right, vertical-right, vertical-left} are defined as vertically oriented modes, and {horizontal, horizontal-up, horizontal-down, diagonal-down/right} are defined as horizontally oriented modes. Note that diagonal-down/right is covered by both sets. After DC mode is examined, if $J(s, c, MODE|QP, \lambda_{I4 \times 4, DC\_PRED})$ is less than a threshold $T_{DC4}$, the search may be terminated and DC selected as the best sub-mode for INTRA 4×4. Otherwise, both vertical and horizontal modes are examined and, if the vertical mode has the least $J(s, c, MODE|QP, \lambda_{I4 \times 4})$ among these three sub-modes (i.e., this block tends to be vertically oriented), then the other three vertically oriented sub-modes, {diagonal-down/right, vertical-right, vertical-left}, will be tested. Similarly, if the horizontal mode has the least J(s, c, MODE|QP,$\lambda_{I4\times4}$) among these three sub-modes (i.e., this block tends to be horizontally oriented), then the other three horizontally oriented sub-modes, {horizontal-up, horizontal-down, diagonal-down/right}, will be tested. This is also illustrated in FIG. 7.

Figure 7:
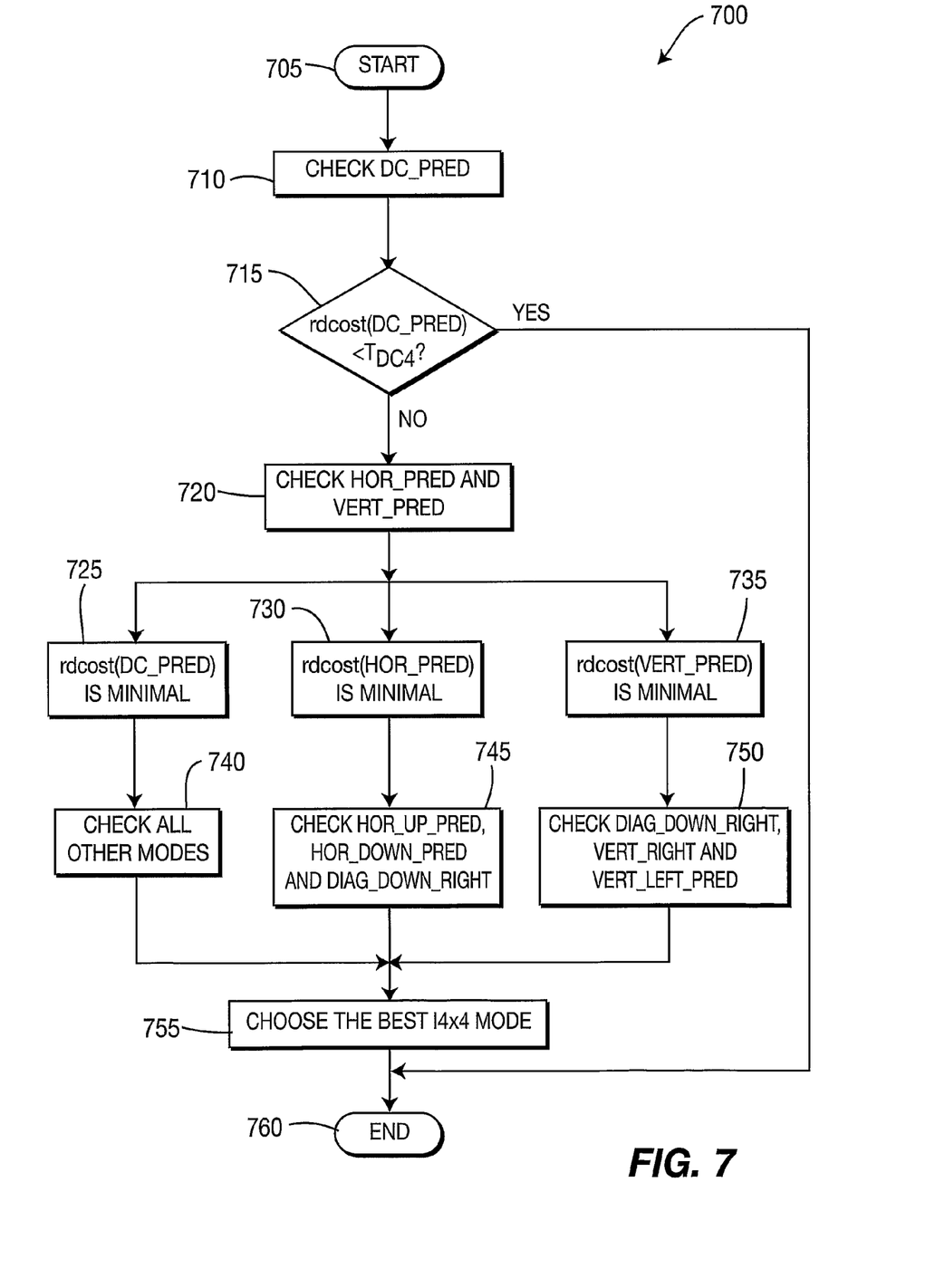
FIG. 7 shows a flow diagram for another method for mode decision for INTRA 4×4 in accordance with the principles of the present invention.

Turning to FIG. 7, a method for mode decision for INTRA 4×4 is indicated generally by the reference numeral 700. The method 700 includes a start block 705 that passes control to a function block 710. The function block 710 checks the DC prediction mode (DC_PRED), and passes control to a decision block 715. The decision block 715 determines whether or not the rate-distortion cost of the DC prediction mode, rdcost(DC_PRED), is less than a threshold $T_{DC4}$. If rdcost (DC_PRED) is not less than the threshold $T_{DC4}$, then control is passed to a function block 720. Otherwise, if rdcost(DC_PRED) is less than the threshold $T_{DC4}$, then control is passes to an end block 760.

The function block 720 checks the horizontal prediction mode (HOR_PRED) and the vertical prediction mode (VERT_PRED), and passes control to a function block 725, a function block 730, and a function block 735. The function block 725 determines whether or not the rate-distortion cost of the DC prediction mode, rdcost(DC_PRED), is minimal, and passes control to a function block 740. The function block 730 determines whether or not the rate-distortion cost of the horizontal prediction mode, rdcost(HOR_PRED) is minimal, and passes control to a function block 745. The function block 735 determines whether or not the rate-distortion cost of the vertical prediction mode, rdcost(VER_PRED) is minimal, and passes control to a function block 750.

The function block 740 checks all other modes, and passes control to a function block 755.

The function block 745 checks the horizontal-up prediction mode (HOR_UP_PRED), the horizontal-down prediction mode (HOR_DOWN_PRED), and the diagonal-down/right prediction mode (DIAG_DOWN_RIGHT), and passes control to function block 755.

The function block 750 checks the diagonal-down/right mode (DIAG_DOWN_RIGHT), the vertical-right prediction mode (VERT_RIGHT), and the vertical-left prediction mode (VERT_LEFT_PRED), and passes control to function block 755.

The function block 755 chooses the best I4×4 mode from among the tested modes, and passes control to end block 760.

It is to be appreciated that other information, such as the best inter mode, can be considered in the intra mode decision process. For instance, if the best mode is 16×8 or 8×4, then the macroblock is more likely to be horizontally oriented, and only those intra modes that are horizontally oriented and the DC mode are tested. However, if the best mode is 8×16 or 4×8, then the macroblock is more likely to be vertically oriented, and only those intra modes that are vertically oriented and the DC mode are tested. Further, for INTRA 4×4, the best sub-mode from INTRA 16×16 can be used to determine which subset to test. For example, if the best mode from INTRA 16×16 is the vertical mode, then only the vertically oriented sub-modes and the DC mode for INTRA 4×4 are tested. However, if the best mode from INTRA 16×16 is the horizontal mode, then only the horizontally oriented sub-modes and the DC mode are tested for INTRA 4×4.

From statistics, only considering DC mode for chroma INTRA 8×8 and removing plane mode from INTRA 16×16 prediction much can save computation significantly without losing much coding efficiency. Therefore, only DC mode is considered for chroma INTRA 8×8 and plane mode is removed from INTRA 16×16.

Figure 8:
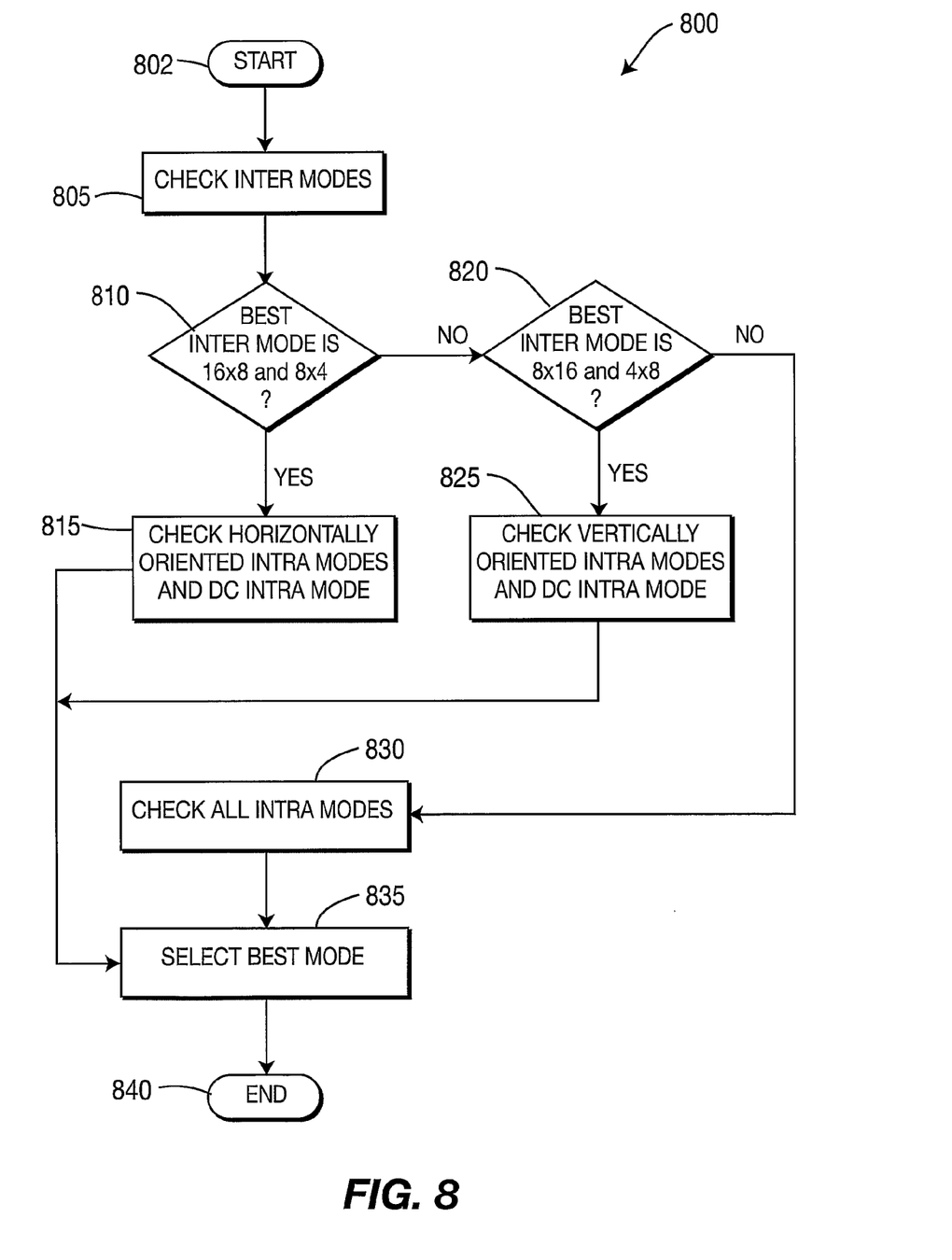
FIG. 8 shows a flow diagram for a method for fast intra mode decision base on inter mode partitions in accordance with the principles of the present invention.

Turning to FIG. 8, an exemplary method for fast intra mode decision base on inter mode partitions is indicated generally by the reference numeral 800.

A start block 802 passes control to a function block 805. The function block 805 checks inter modes, and passes control to a decision block 810. The decision block 810 determines whether or not the best inter mode is 16×8 or 8×4. If the best inter mode is not 16×8 or 8×4, then control is passes to a decision block 820. Otherwise, if the best inter mode is 16×8 or 8×4, then control is passed to a function block 815.

The decision block determines whether or not the best inter mode is 8×16 or 4×8. If the best inter mode is not 8×16 or 4×8, them control is passed to a function block 830. Otherwise, if the best inter mode is 8×16 or 4×8, then control is passed to a function block 825.

The function block 815 checks horizontally oriented intra modes and DC intra mode and passes control to a function block 835. The function block 825 checks vertically oriented intra modes and DC intra mode and passes control to a function block 835.

The function block 830 checks all intra modes, and passes control to a function block 835. The function block 835 selects the best mode among the tested modes, and passes control to an end block 840.

Figure 9:
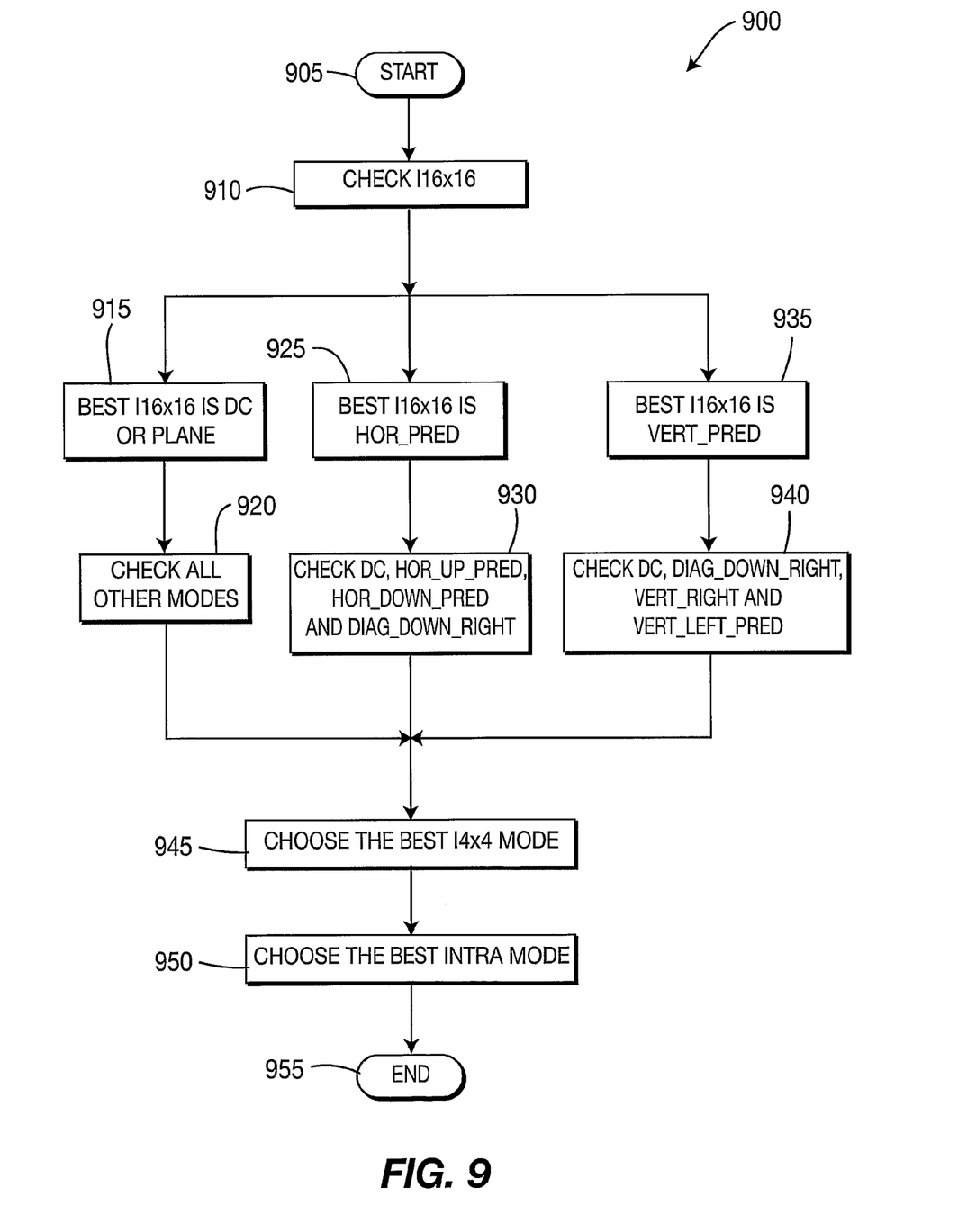
FIG. 9 shows a flow diagram for a method for fast INTRA 4×4 mode decision based on INTRA 16×16 mode in accordance with the principles of the present invention.

Turning to FIG. 9, an exemplary method for fast INTRA 4×4 mode decision based on INTRA 16×16 mode is indicated generally by the reference numeral 900. A start block 905 passes control to a function block 810. The function block 810 checks the INTRA 16×16, and passes control to a function block 915, a function block 925, and a function 935.

The function block 915 determines whether or not the best INTRA 16×16 mode is DC or PLANE, and passes control to a function block 920. The function block 920 checks all other modes, and passes control to a function block 945.

The function block 925 determines whether or not the best INTRA 16×16 mode is HOR_PRED, and passes control to a function block 930. The function block 930 checks the DC, HOR_UP_PRED, HOR_DOWN_PRED, and DIAG_DOWN_RIGHT modes, and passes control to function block 945.

The function block 935 determines whether or not the best INTRA 16×16 mode is VERT_PRED, and passes control to a function block 940. The function block 940 checks the DC, DIAG_DOWN_RIGHT, VERT_RIGHT, AND VERT_LEFT_PRED modes, and passes control to function block 945.

The function block 945 chooses the best INTRA 4×4 mode from among the tested modes, and passes control to a function block 950. The function block 950 chooses the best intra mode from among the tested modes, and passes control to an end block 955.

A description will now be given of some of the many attendant advantages/features of the present invention. For example, one advantage/feature is a video encoder that performs intra mode selection when encoding a macroblock, by testing a subset, S1, of the intra modes to compute the rate-distortion (RD) cost, and utilizing the RD cost to decide on early termination and additional modes to be tested. Another advantage/feature is a video encoder as described above, wherein the subset of intra modes includes {DC, vertical, horizontal}. Yet another advantage/feature is a video encoder as described above, wherein another subset, S2, of remaining intra modes is selected for testing, based on which of the intra modes of S1 had the lowest cost. Moreover, another advantage/feature is a video encoder with the other subset S2 of remaining intra modes as described above, wherein the cost can be a sum of squared difference values. Further, another advantage/feature is a video encoder with the other subset S2 of remaining intra modes as described above, wherein the other subset S2 of remaining intra modes includes {diagonal-down/right, vertical-right, vertical-left} modes when a vertical mode has the smallest RD cost in the subset S1, and the other subset S2 of remaining intra modes includes {horizontal-up, horizontal-down, diagonal-down/right} modes when a horizontal mode has the smallest RD cost in the subset S1. Moreover, another advantage/feature is a video encoder wherein intra prediction direction is based on the block type partition of the best inter mode. Also, another advantage/feature is a video encoder with intra prediction direction as described above, wherein intra prediction only tests horizontally oriented modes and the DC mode when the best inter mode is 16×8 or 8×4, and intra prediction only tests vertically oriented modes and the DC mode when the best inter mode is 8×16 or 4×8. Additionally, another advantage/feature is a video encoder wherein INTRA 4×4 prediction direction is based on the best sub-mode of INTRA 16×16. Moreover, another advantage/feature is a video encoder with INTRA 4×4 prediction direction as described above, wherein INTRA 4×4 prediction only tests horizontally oriented modes and the DC mode when the best INTRA 16×16 sub-mode is horizontal, and INTRA 4×4 prediction only tests vertically oriented modes and the DC mode when the best INTRA 16×16 sub-mode is horizontal.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus for encoding video data for an image that is divisible into macroblocks, comprising:
    an encoder for performing intra 4×4 mode selection by:
        selecting an intra 16×16 mode;
        if the rate distortion cost of the selected intra 16×16 mode is less than a pre-defined threshold, selecting an intra 4×4 mode from only a first subset of intra 4×4 modes, wherein a second subset of remaining intra 4×4 modes is selected for testing, based upon which of the intra 4×4 modes of the first subset of intra 4×4 modes had a lowest cost.

2. The apparatus according to claim 1, wherein the first subset of intra 4×4 modes correspond to intra 4×4 {DC, vertical, and horizontal} modes.

3. The apparatus according to claim 1, wherein the lowest cost is a sum of squared difference values.

4. The apparatus according to claim 1, wherein the second subset of the remaining intra 4×4 modes is selected for testing, based upon which of the intra 4×4 modes of the first subset had the lowest cost, and the second subset includes {diagonal-down/right, vertical-right, and vertical-left} modes when a vertical mode has a smallest rate distortion cost in the first subset, and the second subset includes {horizontal-up, horizontal-down, and diagonal-down/right} modes when a horizontal mode has the smallest rate distortion cost in the first subset.

5. The apparatus of claim 4, wherein orientations used for the modes in the first subset of intra modes and the second subset of intra modes are identical to orientations used for INTRA 4×4 prediction modes specified in the H.264 Standard.

6. A method for encoding video data for an image that is divisible into macroblocks, comprising the step of:
    performing intra 4×4 mode selection when encoding a current macroblock, wherein said performing step comprises the steps of:
        selecting an intra 16×16 mode;
        if the rate distortion cost of the selected intra 16×16 mode is less than a pre-defined threshold, selecting an intra 4×4 mode from only a first subset of intra 4×4 modes, and selecting a second subset of intra 4×4 modes for testing, based on which of the intra 4×4 modes of the first subset had a lowest cost.

7. The method according to claim 6, wherein the lowest cost is a sum of squared difference values.

8. The method according to claim 6, wherein the second subset of the intra 4×4 modes is selected for testing, based on which of the intra 4×4 modes of the first subset had the lowest cost, and the second subset includes {diagonal-down/right, vertical-right, and vertical-left} modes when a vertical mode has a smallest rate distortion cost in the first subset, and the second subset includes {horizontal-up, horizontal-down, and diagonal-down/right} modes when a horizontal mode has the smallest rate distortion cost in the first subset.

9. The method of claim 8, wherein orientations used for the modes in the first subset of intra modes and the second subset of intra modes are identical to orientations used for INTRA 4×4 prediction modes specified in the H.264 Standard.

10. The method according to claim 6, wherein the first subset of intra 4×4 modes correspond to intra 4×4 {DC, vertical, and horizontal} modes.

* * * * *